(12) United States Patent
Kracke (10) Patent No.: US 11,585,398 B2
(45) Date of Patent: Feb. 21, 2023

(54) ADJUSTABLE SPRING ASSEMBLY (71) Applicant: Goodrich Actuation Systems Limited, Solihull (GB)

(72) Inventor: Jeremy Kracke, Staffordshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/169,823

(22) Filed: Feb. 8, 2021

(65) Prior Publication Data
US 2021/0246958 A1 Aug. 12, 2021

(30) Foreign Application Priority Data

Feb. 10, 2020 (EP) ..................................... 20275033

(51) Int. Cl.
*F16F 1/32* (2006.01)
*F16F 1/02* (2006.01)
*F16F 1/06* (2006.01)

(52) U.S. Cl.
CPC ................ *F16F 1/028* (2013.01); *F16F 1/06* (2013.01); *F16F 1/328* (2013.01)

(58) Field of Classification Search
CPC .... F16F 1/028; F16F 1/048; F16F 1/06; F16F 1/328
See application file for complete search history.

(56) References Cited

U.S. PATENT DOCUMENTS

| 4,579,201 A | 4/1986 | Tiedeman |
| 4,898,265 A | 2/1990 | Metcalf |
| 4,901,987 A * | 2/1990 | Greenhill ................... F16F 1/06 267/182 |
| 5,558,393 A * | 9/1996 | Hawkins ................... F16F 1/328 267/164 |
| 5,639,074 A * | 6/1997 | Greenhill ................. F16F 1/328 267/158 |
| 6,068,250 A * | 5/2000 | Hawkins ................. F16F 1/328 267/164 |
| 6,669,184 B2 * | 12/2003 | Cai ......................... F16F 1/328 267/180 |

(Continued)

FOREIGN PATENT DOCUMENTS

| DE | 1780439 U | 12/1958 |
| JP | H09177852 A | 7/1997 |

(Continued)

OTHER PUBLICATIONS

Extended European Search Report for International Application No. 20275033.7 dated Sep. 25, 2020, 7 pages.

*Primary Examiner* — Thomas W Irvin (74) *Attorney, Agent, or Firm* — Cantor Colburn LLP (57) ABSTRACT

A spring assembly comprises an edge wound wave spring and a shim. The spring comprises a plurality of axially spaced, axially compressible wave-like turns extending between a first end portion and a second end portion. The first end portion comprises a plurality of closely arranged parallel turns. The shim comprises a shim body and at least one mounting lug projecting radially from the shim body. The mounting lug is received between adjacent turns of the first end portion of the edge wound wave spring for retaining the shim to the edge wound wave spring.

15 Claims, 5 Drawing Sheets

(56) References Cited

U.S. PATENT DOCUMENTS

| | | | | |
|---|---|---|---|---|
| 6,758,465 | B1* | 7/2004 | Greenhill | F16F 1/06 |
| | | | | 267/162 |
| 6,761,270 | B2* | 7/2004 | Carew | B01D 29/902 |
| | | | | 210/497.1 |
| 7,210,181 | B1* | 5/2007 | Price | A47C 27/065 |
| | | | | 5/255 |
| 7,793,923 | B2* | 9/2010 | Suzuki | F16F 1/328 |
| | | | | 267/180 |
| 8,167,215 | B2* | 5/2012 | Sansum | G05D 23/1346 |
| | | | | 236/12.11 |
| 9,945,460 | B2 | 4/2018 | Davies | |
| 2007/0228626 | A1* | 10/2007 | Suzuki | F16F 1/328 |
| | | | | 267/180 |
| 2008/0111289 | A1* | 5/2008 | Matsumura | F16F 1/06 |
| | | | | 267/71 |
| 2008/0185242 | A1 | 8/2008 | Mayer et al. | |
| 2015/0111650 | A1 | 4/2015 | Kohuth et al. | |

FOREIGN PATENT DOCUMENTS

| | | |
|---|---|---|
| JP | 2009192035 A | 8/2009 |
| JP | 2017227241 A | 12/2017 |

\* cited by examiner

ADJUSTABLE SPRING ASSEMBLY

FOREIGN PRIORITY

This application claims priority to European Patent Application No. 20275033.7 filed Feb. 10, 2020, the entire contents of which is incorporated herein by reference.

TECHNICAL FIELD

The present disclosure relates to an adjustable spring assembly and a spring for use in such an assembly.

BACKGROUND

Adjustable spring assemblies are used in a wide range of applications. One typical application is as a preloading spring in a torque limiting device. In a known construction of torque limiting device, drive is transmitted from an input shaft to an output shaft through a plurality of drive balls. The drive balls are received in pockets defined between elements rotationally coupled to the input and output shafts respectively. The elements are resiliently biased towards one another by means of a preloading spring, typically a compression coil spring. The pockets are ramped such that if the torque applied to the input shaft exceeds a predetermined value, set by the loading of the preloading spring, the drive balls may move up the ramped surface of the respective element and move the opposed element axially against the force of the preloading spring. This axial movement may be used to apply a braking force to the system, for example through friction plates, thereby limiting the torque transmissible through the system.

In order to operate consistently, the preloading force applied by the spring must be accurately set. This is normally achieved by the use of a shim arranged between the spring and an opposed surface. Typically a unit is initially assembled with a shim and the unit tested. If the preload is not correct, then the unit must be disassembled and the shim machined, for example ground, to change its thickness. The unit is then reassembled and re-tested, and the process repeated until the appropriate preload is achieved. This may be time consuming.

SUMMARY

From a first aspect, the present disclosure comprises a spring assembly comprising an edge wound spring and a shim. The edge wound wave spring comprises a plurality of axially spaced, axially compressible wave-like turns extending between a first end portion and a second end portion. The first end portion comprises a plurality of closely arranged turns. The shim comprises a shim body and at least one mounting lug projecting radially from the shim body. The at least one mounting lug is received between adjacent turns of the first end portion of the edge wound wave spring for retaining the shim to the edge wound wave spring.

In an embodiment of the above, the shim may comprise a plurality of mounting lugs. The mounting lugs may optionally be circumferentially equispaced about the shim body.

In embodiments of any of the above, the first end portion of the edge wound wave spring has an inner diameter and the shim body has an outer diameter which is smaller than the inner diameter of the first portion of the edge wound wave spring. This means that the shim body may be received radially within the first end portion of the edge wound wave spring, optionally with a sliding fit.

In embodiments of any of the above the shim body may be annular.

In embodiments of any of the above the turns of the first end portion of the edge wound wave spring may comprise a plurality of generally flat locating portions joined by respective axially arched portions.

The mounting lugs of the shim may be located axially between the flat locating portions of adjacent turns of the first end portion of the edge wound wave spring.

The number of flat locating portions per turn of the first end portion of the edge wound wave spring may be equal to greater than the number of mounting lugs of the shim in some embodiments.

In embodiments of any of the above the second end portion of the edge wound wave spring may comprises a planar turn.

The disclosure also provides an edge wound wave spring comprising a plurality of axially spaced, axially compressible wave-like turns extending between a first end portion and a second end portion, the first end portion comprising a plurality of closely arranged turns.

The turns of the first end portion of the edge wound wave spring may comprise a plurality of generally flat locating portions joined by respective axially arched portions.

The second end portion of the edge wound wave spring may comprise a planar turn.

In embodiments of any of the above, the first end portion of the edge wound wave spring may comprise at least two, for example at least three, for example at least four, for example at least five turns.

The disclosure also provides a preloaded assembly comprising a spring assembly in accordance with the disclosure arranged axially between an axially movable element to be preloaded and a reaction element.

The disclosure also provides a torque limiter comprising such a preloaded assembly, the axially movable element being a rotary element which is movable axially against the force of the spring assembly in the event of a torque in the torque limiter exceeding a predetermined value which is determined by the preload force of the spring assembly.

The disclosure also provides a method of setting a preload in a spring assembly in accordance with the disclosure comprising screwing the at least one mounting lug of the shim into the turns of the first end portion of the edge wound wave spring, and rotating the shim until an overall axial length Lo of the spring assembly reaches a desired value representative of the desired preload.

BRIEF DESCRIPTION OF DRAWINGS

An embodiment of the disclosure will now be described, by way of example only, with reference to the accompanying drawings in which.

DETAILED DESCRIPTION

Figure 1:
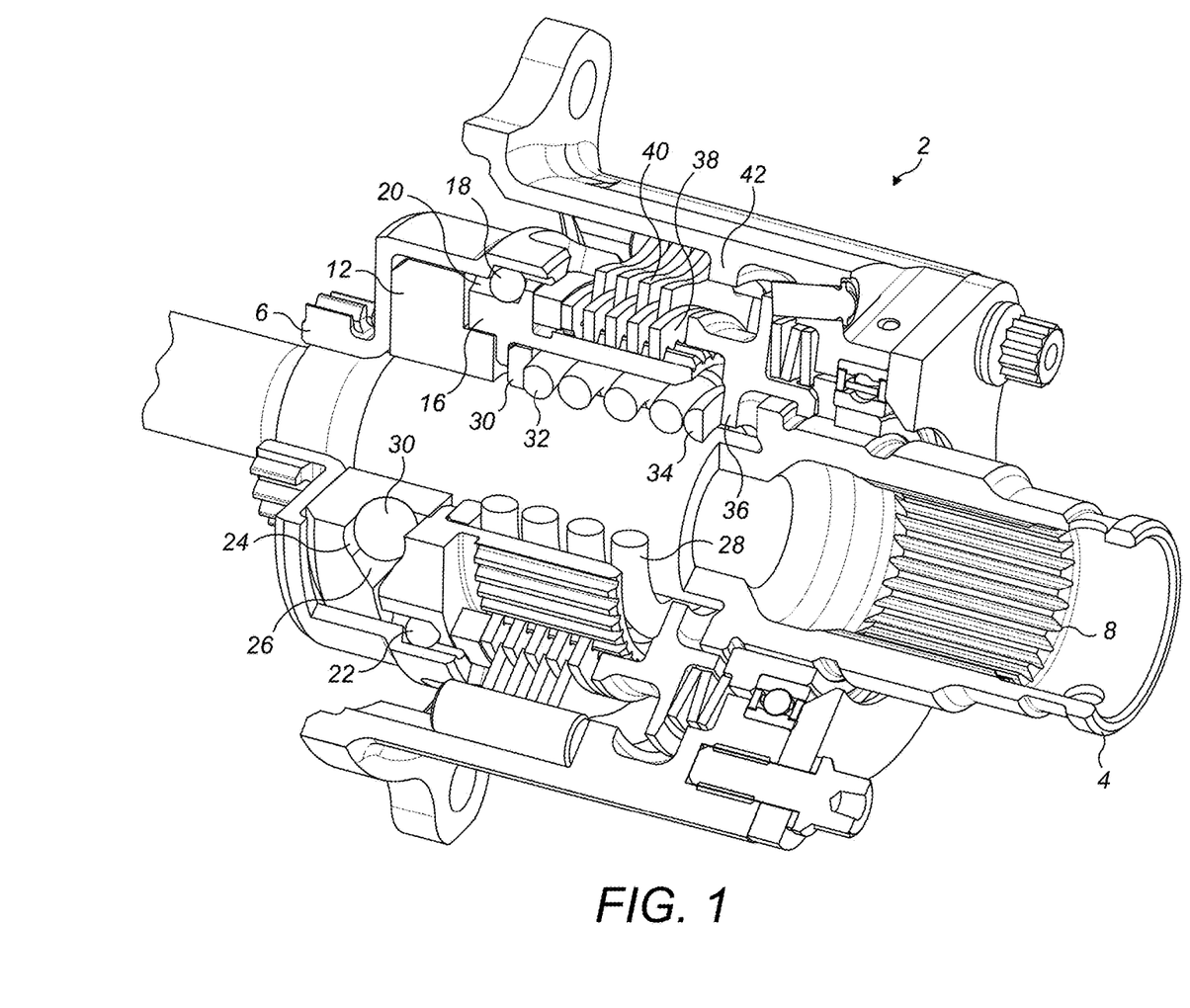
FIG. 1 shows a torque limiting device.

Referring firstly to FIG. 1, a torque limiter 2 comprises an input shaft 4 and an output shaft 6. The input shaft 4 comprises internal splines 8 for connection to a drive shaft not shown. The input shaft for further comprises external splines (not shown) which mesh with a rotary element 12. Axially opposed to the rotary element 14 is an axially movable output element 16 which drives the output shaft 6 via drive balls 18 arranged in drive pockets 20. A plurality of detent balls 22 are received in pockets 24 defined between the pocket-defining element 14 and the output element 16.

As can be seen from FIG. 1, the axially facing surface 26 of the pocket defining element 14 in the pocket 24 is ramped. It will also be seen that the output element 16 is resiliently biased towards the pocket defining element 14 by means of a preloaded coil spring 28. A shim 30 is arranged between one end 32 of the coil spring 28 and the output element 16. The opposite end 34 of the coil spring 28 is located against an axially fixed element 36.

The output element 16 is also coupled rotationally to a plurality of rotary friction plates 38 which are arranged between static friction plates 40 mounted in the limiter housing 42.

In normal operation, the preload of the coil spring 28 is sufficient to maintain the detent balls 22 in position at the bottom of the ramped surface 26 of the pocket defining element 14 so that the output element is driven through the detent balls 22. However, should input torque exceed a predetermined value, which is determined by the preload of the spring 28, the detent balls 22 will be forced along the ramped surface 26 so as to push the output element 16 axially forward. This in turn will move the rotary friction plates 38 into contact with the static friction plates 40, thereby braking the output element 16 thereby limiting the torque transmitted through the device.

It will be appreciated that the torque at which the detent balls 22 move up the ramped surfaces 26 is determined by the preload in the spring 28. Accordingly, this must be set accurately so that the device operates reliably. This process is an iterative one, requiring potentially the use of a number of different size of shims 30 to be tried before the appropriate preload is achieved.

Figure 2:
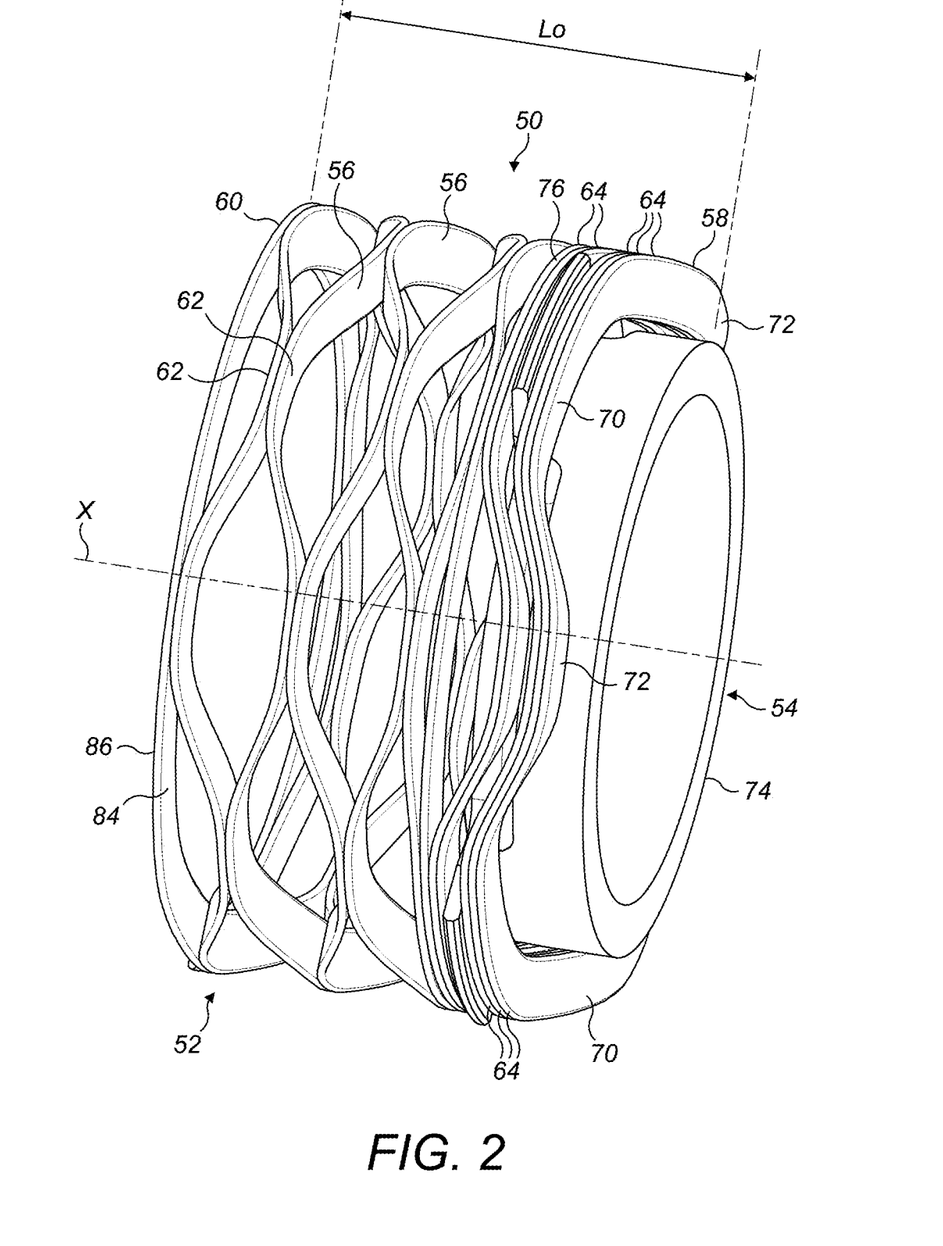
FIG. 2 shows a spring assembly in accordance with the disclosure.
Figure 3:
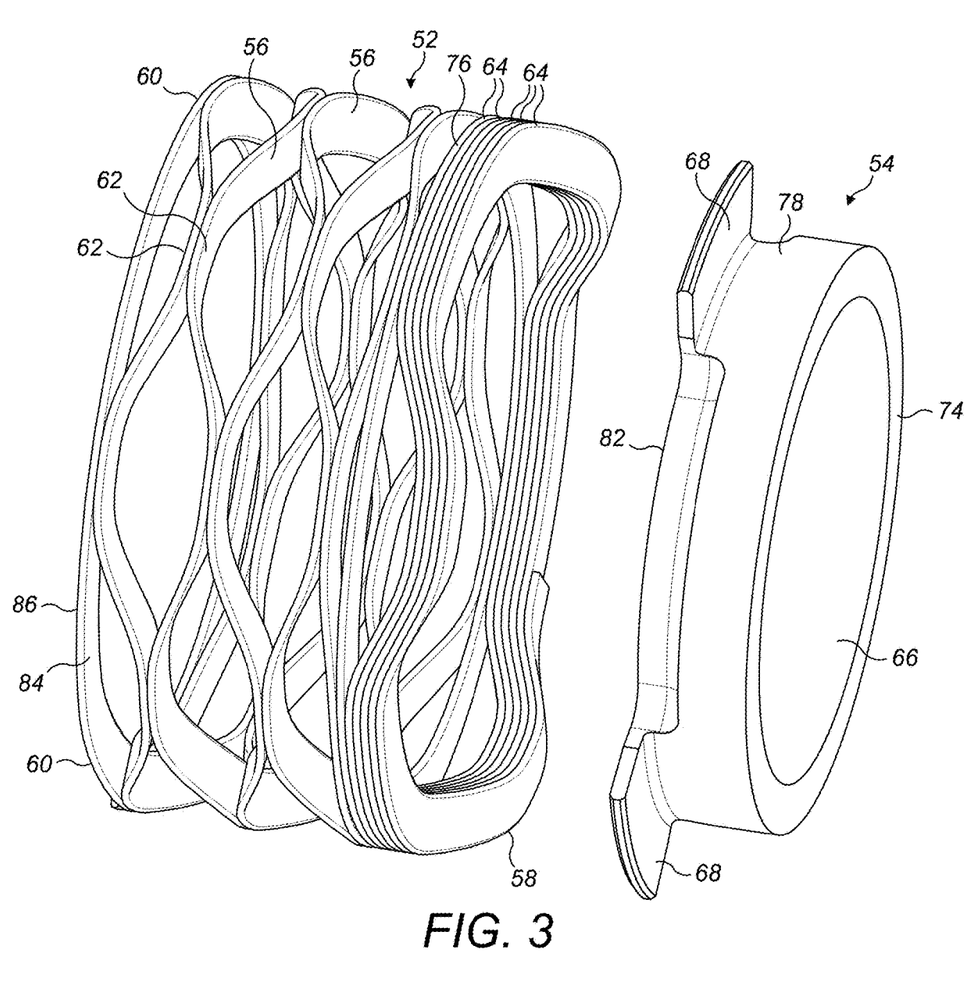
FIG. 3 shows an exploded view of the spring assembly of FIG. 2.
Figure 4:
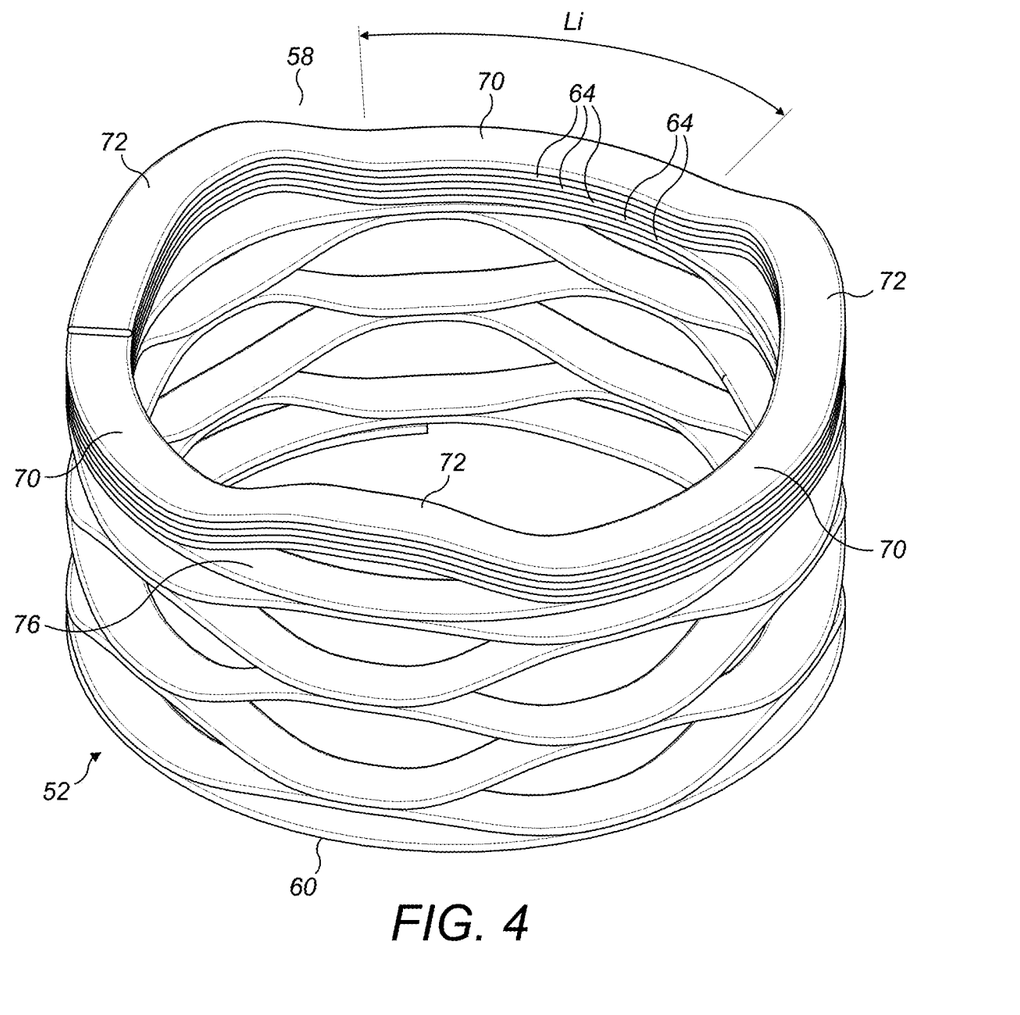
FIG. 4 shows the spring of the spring assembly of FIG. 2.
Figure 5:
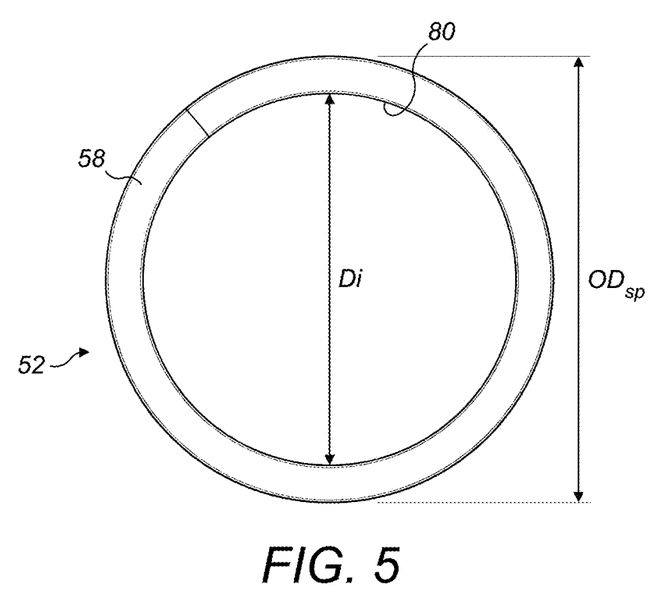
FIG. 5 shows an end view of the spring of the spring assembly of FIG. 2.

In accordance with the disclosure, the shim and coil spring arrangement disclosed above may be substituted by a spring assembly 50 as illustrated in FIGS. 2 to 4.

With reference to FIGS. 2 to 4, a spring assembly 50 in accordance with the disclosure comprises an edge wound wave spring 52 and a shim 54 mounted to the edge wound wave spring 52.

Edge wound wave springs are springs which are wound from flattened spring wire. Such types of spring are generally known in the art and are manufactured by a number of different manufacturers, for example, Borrelly Spring Washers.

As is known from existing spring designs, the edge wound wave spring 52 of the disclosure comprises a plurality of axially compressible wave-like turns 56 extending between a first end portion 58 and a second end portion 60. The crests 62 of adjacent turns 56 contact each other such that when the spring 52 is compressed axially, the wave-like turns 56 will deform and produce a reaction force. As shown, each turn 56 is formed as a single turn although in other embodiments each turn 56 may be formed as a plurality of closely adjacent parallel turns 56.

Unlike known designs, however, the first end portion 58 of the spring 52 comprises a plurality of closely arranged turns 64 of material. The turns 64 may be considered as being generally parallel. In the disclosed embodiment, there are five turns 64 in the first end portion 58. However, the particular number of turns 64 may vary depending on the amount of adjustment in the load to be applied by the spring 52. There need to be at least two turns 64 however to allow for mounting of the shim 54. The turns 64 may, in the rest state of the spring 52, touch each other as shown. In other embodiments, there may be a small spacing between the turns 64. A generally planar turn 76 may be provided at the base of the first end portion 58, separating it from the main axially compressible turns 56 of the spring 52.

As can be seen from FIGS. 2 and 3, the shim 54 is mounted to the first end portion 58 of the spring 52. The shim 54 comprises a shim body 66 and three mounting lug 68 which project radially outwardly from the shim body 66. The mounting lugs 68 are received between adjacent turns 64 of the first end portion 58 so as to retain the shim 54 on the spring 52. The outer diameter ODsh of the shim 54, defined by the outer edges of the mounting lugs 68 may, as shown, be slightly greater than, the outer diameter ODsp of the spring 52 such that the mounting lugs 68 protrude slightly from the spring 52. This may facilitate mounting of the shim 54. In other embodiments, however, the mounting lugs 68 may not protrude radially from the spring 52.

In this embodiment, there are three mounting lugs 68. However, the shim body 66 may comprise a different number of mounting lugs 68. For example it may be possible to provide just a single mounting lug 68 in some embodiments or a different number of multiple mounting lugs 68, for example two or four mounting lugs 68.

In embodiments with multiple mounting lugs 68, the mounting lugs 68 may, as shown, be circumferentially equi-spaced about the external periphery of the shim body 66. This helps distributes the clamping forces acting on the shim 54 evenly around the shim body 66.

Figure 6:
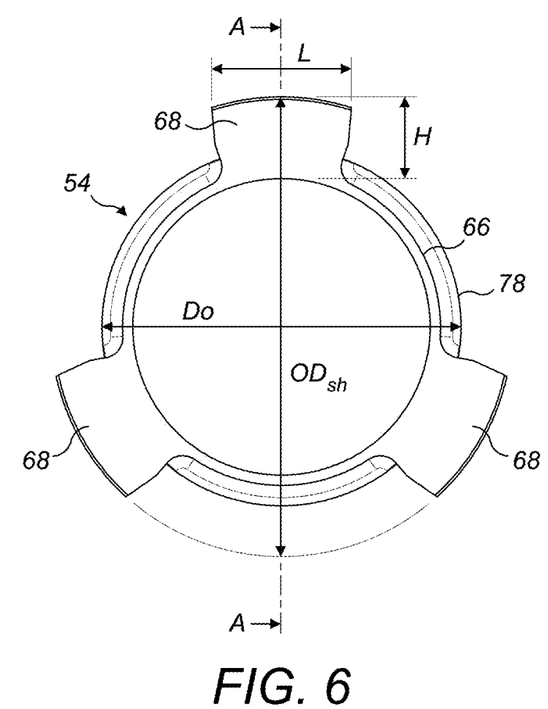
FIG. 6 shows an end view of the shim of the spring assembly of FIG. 2.
Figure 7:
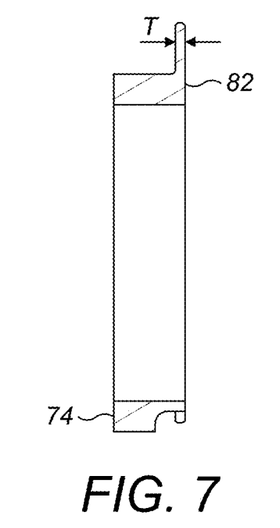
FIG. 7 shows a sectional view along the line A-A of FIG. 6.

The mounting lugs 68 may, as shown, be of a similar shape. For example as shown in FIGS. 6 and 7 they may have the same axial thickness T, circumferential length L and radial height H. The axial thickness T of the mounting lugs 68 should be greater than any axial spacing between the turns 64 of the first end portion 58 of the spring 52 such that the mounting lugs 68 are clamped between the turns 64. The term "closely arranged turns" as used herein in relation to the turns 64 of the first end portion 58 may therefore be interpreted as having no axial spacing or a smaller axial spacing than the axial thickness T of the mounting lugs 68.

In the described embodiment, the turns 64 of the first end portion 58 of the spring 54 are not planar, but undulate. Thus each turn 64 comprises a series of generally flat locating portions 70 joined by a series of axially arched portions 72. As can be seen from FIG. 2, the mounting lugs 68 of the shim body 66 are received between the flat locating portions 70 of adjacent turns 64 of the first portion 58 of the spring 54. The circumferential length L of the mounting lugs 68 is slightly shorter than the circumferential lengthy L1 of the locating portions 70. It will be understood that should the shim body 66 try to rotate 66 about its axis X in use (for example due to vibration) the mounting lugs 68 will after a very small rotation (for example less than) 20° come into contact with the arched portions 72 which will resist the rotation. The arched portions 72 thus act as locking features.

In the disclosed embodiment, the number of locating portions 70 is equal to the number of mounting lugs 68. However, this is not essential. In other embodiments for example, the number of location portions 70 may be greater than the number of mounting lugs 66, such that the circumferential spacing between the locating portions 70 is less than the circumferential spacing between the mounting lugs 68. This may be advantageous in that it may allow for a finer adjustment of the position of the shim 54 on the spring 62

(due to the larger number of locating portions) while avoiding the need to provide a larger number of mounting lugs 68, which may be advantageous from a weight perspective. For example half the number of mounting lugs 68 may be provided at a circumferential spacing which is half that of the spacing of the locating portions 70.

In this embodiment the shim body 66 is annular so as, for example, to allow for the passage through the shim body of a drive shaft such as shown in FIG. 1. Of course, this is not essential and the shim body 66 could, in other applications, be a solid disc.

The shim body 66 has an axially facing end surface 74 for engagement with an axially opposed surface in use. It also has a radially outer surface 78 having an outer diameter Do. The diameter Do is smaller than the inner diameter Di of the radially inner surface 80 defined by the turns 64 of the first end portion 58 (see FIG. 6). In some embodiments, the shim body 66 may be a sliding fit within the first end portion 58 of the spring 52 so as to assist in its radial location.

In embodiments of the disclosure, the mounting lugs 68 may be provided at an end 82 of the shim body 66 opposite the end surface 70. This may help reduce the weight of the shim, avoiding the use of unnecessary additional shim material at that end of the shim 54.

In the embodiment illustrated the second end portion 60 of the spring 52 comprises a single generally planar turn 84 having an axially facing surface 86 for engaging an opposed surface in use. In other embodiments, the second end portion 60 of the spring 52 may comprise multiple turns to form a multi-layer integrated washer.

To assemble the shim assembly 50, the shim 54 is in effect simply screwed into the first end portion 58 of the spring 52, that is, the mounting lugs 68 are screwed into the turns 64 of the first end portion 58. The shim 54 is rotated as much as is necessary to produce a desired overall length Lo between the axially facing end surface 74 of the shim 54 and the axially facing surface 84 of the second end portion 60. This overall length Lo will be greater than the spacing between two elements between the spring assembly is inserted, such that the spring assembly will be compressed when positioned, thereby preloading one of the elements for example preloading the output element 16 of the torque limiter 2 illustrated in FIG. 1. The shim 54 is retained rotationally on the spring 52 due to the arrangement of the mounting lugs on the flat locating portions between the arched portions 72 of the first end portion turns 64.

If upon assembly of a device incorporating the spring assembly 50, a preload is found not to be correct, the preload can be modified by simply rotating the shim 54 in an appropriate direction to move it further into or further out of the spring 52, thereby modifying the overall length Lo and thus the preload created by the spring assembly. This avoids the need for complete disassembly of a shim from a spring and its machining as was required in prior devices.

It will be appreciated that although the spring assembly of the disclosure has been described with reference to providing a preload in a torque limiter, the spring assembly may be used to provide a preload in any device requiring a preload, for example ball valves, detents, brake friction packs and so on.

The invention claimed is:

1. A spring assembly comprising:
    an edge wound wave spring comprising a plurality of axially spaced, axially compressible wave shaped turns extending between a first end portion and a second end portion, the first end portion comprising a plurality of closely arranged turns; and
    a shim comprising a shim body and at least one mounting lug projecting radially from the shim body, the at least one mounting lug being received between adjacent turns of the first end portion of the edge wound wave spring for retaining the shim to the edge wound wave spring.

2. A spring assembly as claimed in claim 1, wherein the shim comprises a plurality of mounting lugs, the plurality of mounting lugs optionally being circumferentially equispaced about the shim body.

3. A spring assembly as claimed in claim 1, wherein the first end portion of the edge wound wave spring has an inner diameter Di and the shim body has an outer diameter (Do) which is smaller than the inner diameter Di of the first portion of the edge wound wave spring,
    whereby the shim body may be received radially within the first end portion of the edge wound wave spring, optionally with a sliding fit.

4. A spring assembly as claimed in claim 1, wherein the shim body is annular.

5. A spring assembly as claimed in claim 1, wherein the turns of the first end portion of the edge wound wave spring comprise a plurality of generally flat locating portions joined by respective axially arched portions.

6. A spring assembly as claimed in claim 5, wherein the mounting lugs of the shim are located axially between the flat locating portions of adjacent turns of the first end portion of the edge wound wave spring.

7. A spring assembly as claimed in claim 6, wherein the number of flat locating portions per turn of the first end portion of the edge wound wave spring is equal to greater than the number of mounting lugs of the shim.

8. A spring assembly as claimed in claim 1, wherein the second end portion of the edge wound wave spring comprises a planar turn.

9. A spring assembly as claimed claim 1, wherein the first end portion of the edge wound wave spring comprises at least two turns.

10. A spring assembly as claimed in claim 1, wherein the first end portion of the edge wound wave spring comprises at least three turns.

11. A spring assembly as claimed in claim 1, wherein the first end portion of the edge wound wave spring comprises at least four turns.

12. A spring assembly as claimed in claim 1, wherein the first end portion of the edge wound wave spring comprises at least five turns.

13. A preloaded assembly comprising:
    a spring assembly as claimed in claim 1,
    wherein the spring assembly is arranged axially between an axially movable element to be preloaded and a fixed reaction element.

14. A torque limiter comprising:
    a preloaded assembly as claimed in claim 13,
    wherein the axially movable element is a rotary element which is movable axially against the force of the spring assembly in the event of a torque in the torque limiter exceeding a predetermined value which is determined by the preload force of the spring assembly.

15. A method of setting a preload in a spring assembly as claimed in claim 1, comprising:
    screwing the at least one mounting lug of the shim into the turns of the first end portion of the edge wound wave spring; and rotating the shim until an overall axial length Lo of the spring assembly reaches a desired value representative of the desired preload.

\* \* \* \* \*